United States Patent [19]

Wei et al.

[11] Patent Number: 5,120,807
[45] Date of Patent: Jun. 9, 1992

[54] POLYMERIZATION OF PYRROLE AND ITS DERIVATIVES

[75] Inventors: Yen Wei; Dachuan Yang; Jing Tian, all of Philadelphia, Pa.

[73] Assignee: Drexel University, Philadelphia, Pa.

[21] Appl. No.: 645,072

[22] Filed: Jan. 18, 1991

[51] Int. Cl.$^5$ ............................................. C08F 2/00
[52] U.S. Cl. .................................. 526/204; 526/258; 204/78; 204/59 R
[58] Field of Search ................ 526/204, 258; 204/78, 204/59 R

[56] References Cited

U.S. PATENT DOCUMENTS

| | | | |
|---|---|---|---|
| 2,578,910 | 6/1948 | Uraneck | 526/204 |
| 4,599,194 | 7/1986 | Frommer et al. | 252/518 |
| 4,707,527 | 11/1987 | Druy et al. | 525/417 |
| 4,986,886 | 1/1991 | Wei et al. | 526/256 |

FOREIGN PATENT DOCUMENTS

0180082  9/1987  European Pat. Off.
3425511  1/1986  Fed. Rep. of Germany ...... 526/258

Primary Examiner—Joseph L. Schofer
Assistant Examiner—Alex H. Walker
Attorney, Agent, or Firm—Panitch Schwarze Jacobs & Nadel

[57] ABSTRACT

Electrically conductive polypyrrole and its derivatives are prepared by polymerizing compounds of the formula:

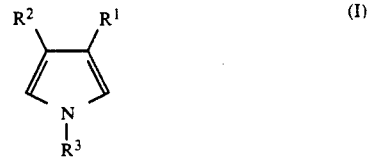

wherein $R^1$, $R^2$ and $R^3$ are independently hydrogen, halogen, $R^4$, $-OR^4$ or $-SR^4$; and $R^4$ is aryl of 4 to 12 carbons or aliphatic of 1 to 20 carbons; comprising reacting the compound of formula I in the presence of an initiator, the initiator comprising a 2-substituted pyrrole nucleus which has a lower oxidation potential than the compound of formula I and which is capable of being incorporated into the polymer resulting from the polymerization reaction; a chemical oxidant or an applied electrochemical potential; and a solvent.

36 Claims, 1 Drawing Sheet

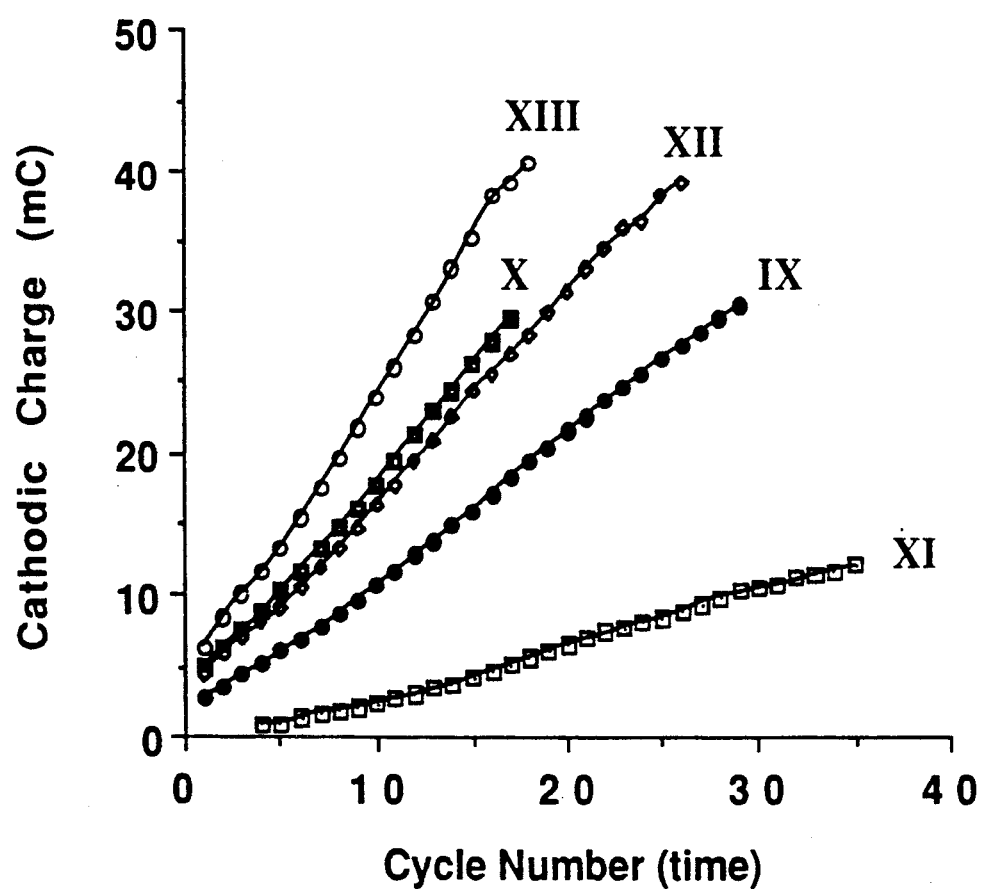

POLYMERIZATION OF PYRROLE AND ITS DERIVATIVES

CROSS-REFERENCE TO RELATED APPLICATION

This application is related to our copending applications Ser. No. 269,857, filed Nov. 10, 1988, entitled "Polymerization of Aniline and its Derivatives", now U.S. Pat. No. 4,940,517, and Ser. No. 530,377, filed May 30, 1990, entitled "Polymerization of Thiophene and its Derivatives," now U.S. Pat. No. 4,986,886.

FIELD OF THE INVENTION

The present invention relates to the chemical and electrochemical preparation of polypyrrole and its substituted derivatives. More particularly, the invention relates to improved methods for polymerizing pyrrole and its derivatives in a more cost-effective and energy-efficient manner, as well as the resulting polypyrroles and polypyrrole derivatives having improved properties, such as increased smoothness and/or uniformity of the electrochemically prepared polymer films.

BACKGROUND OF THE INVENTION

The published literature and patents describe a number of methods for preparing polypyrrole. The first polymerization of pyrrole was reported in 1916 to give a black amorphous powder long referred to as "pyrrole black". In recent years, polypyrrole and its derivatives have received increasing attention as an important class of electrically conducting polymers for their potential commercial and military applications in advanced materials, for example, electroactive, optical, anti-corrosion, electromagnetic-shielding and biomedical materials, and in construction of new types of other electronic materials, for example, microelectrodes, batteries, sensors and drug-release and electronic devices. Using appropriate processing methods, such as stretching of the polymer films or fibers or intercalative polymerization of pyrrole in an inorganic matrix, the conductivities of polypyrroles were reported to be as high as 500–7500 Siemens per centimeter (S/cm).

Polypyrrole and its derivatives can be prepared by (i) chemical or (ii) electrochemical oxidation of pyrrole and its derivatives as represented by the following equation:

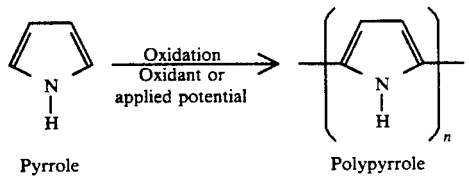

The electrochemical polymerization of pyrrole is generally carried out using potentiostat, galvanostat or cyclic potential sweeping techniques in either aqueous or organic media. To obtain a fast rate of polymerization of pyrrole, a high applied potential of at least about 1.0 volts (V) versus (vs.) saturated calomel electrode (SCE) is generally required. However, the polypyrrole polymers so prepared decompose and/or undergo undesirable side-reactions readily at high potentials, often resulting in substandard quality of the polymers, including irreversible loss of electroactivity. Moreover, the processes disclosed in the scientific literature and patent literature for electrochemically polymerizing pyrrole generally provide reactions having slow reaction rates.

Chemical preparation of polypyrrole and its derivatives is usually carried out via oxidation of the monomers with oxidants, such as hydrogen peroxide and ferric chloride in both the liquid and vapor phases. Chemically prepared polypyrroles are usually of poor quality and possess lower conductivities than those prepared electrochemically. The yield of synthesis of chemically prepared polypyrroles is usually low unless a large amount of oxidant is used, which may cause many structural defects in the polymers.

Most of the previous work in the field of polypyrroles has been devoted to the study of the physicochemical and electrical properties of the polymers and to the study of new monomers. However, the chemistry of the polymerization of pyrrole and its derivatives has received little attention. Moreover, none of the previous methods for the synthesis of electrically conducting polypyrrole and its derivatives involves using organic initiators as in the present invention.

Accordingly, higher yielding and more effective cost and energy efficient methods of producing polypyrrole and its derivatives are needed.

BRIEF SUMMARY OF THE INVENTION

One aspect of the invention relates to a method for polymerizing a compound having the following formula:

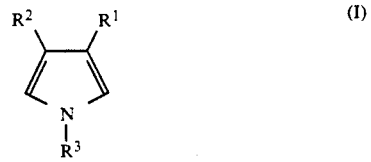

wherein $R^1$, $R^2$ and $R^3$ are independently hydrogen, halogen, $R^4$, $-OR^4$ or $-SR^4$; and $R^4$ is aryl of 4 to 12 carbons or aliphatic of 1 to 20 carbons, comprising reacting the compound of formula I in the presence of (a) an initiator, the initiator comprising a 2-substituted pyrrole nucleus which has a lower oxidation potential than the compound of formula I and which is capable of being incorporated into the polymer resulting from the polymerization reaction; (b) a chemical oxidant or an applied electrochemical potential; and (c) a solvent.

Preferably, the initiator is a compound having the following formula:

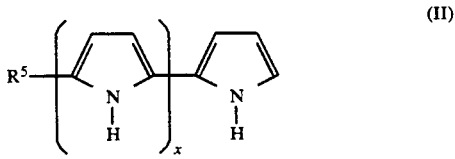

wherein $R^5$ is hydrogen, halogen, $R^6$, $-OR^6$, $-N(R^6)_2$, $-NHR^6$ or $-SR^6$; $R^6$ is aryl of 4 to 12 carbons, aliphatic of 1 to 20 carbons or a polymeric residue; and x is an integer from 0 to 8, with the proviso that when $R^5$ is hydrogen, x is not 0.

The invention is particularly useful for polymerizing pyrrole in the presence of an initiator comprising a 2-substituted pyrrole nucleus, such as 2,2'-bipyrrole, which is incorporated in the polymer chain of the resulting electrically conductive polypyrrole.

BRIEF DESCRIPTION OF THE FIGURE

The FIGURE is a plot of the role of polypyrrole formation with varying amounts of initiators proportional to cathodic charge.

DETAILED DESCRIPTION OF THE PREFERRED EMBODIMENTS

The methods of the present invention are applicable to both the chemical and electrochemical synthesis of electrically conducting polypyrrole and its derivatives. Generally, the methods may be carried out in essentially the same manner as conventional or other known prior art methods of polymerizing pyrrole and its derivatives, except that according to the present invention, an initiator comprising a 2-substituted pyrrole nucleus is included in the reaction mixture.

As a result of incorporating the initiator in the reactions according to the present invention, the rates of polymerization are greatly increased, the synthetic yield of the polypyrroles are increased, the cost effectiveness and energy efficiency of the polymerization are increased, structural defects in the polymers are reduced, the polymers prepared are more uniform, the choice of oxidants and monomers is broadened, lower potentials are required in the electrochemical syntheses, and qualities of the polymers, including electrical conductivities, uniformity of the polymer films, and adhesion of the polymer film to a substrate, such as a platinum electrode surface, are improved. The methods of the present invention also provide a means of controlling the molecular weights and molecular weight distributions of the resulting polymer.

In general, the methods of the present invention offer great enhancement of the rates of polymerizations and result in the preparation of higher quality electrically conducting polypyrrole and its derivatives in significantly increased yields. For example, within a given reaction time span, the addition of 0.1 mole percent of 2,2'-bipyrrole to the electrochemical polymerization of pyrrole leads to about a 300% increase in the amount of the polymeric product deposited on the electrode.

As indicated above, the methods of the present invention are applicable to the polymerization of compounds (monomers) of the following formula I:

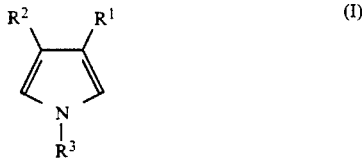

wherein $R^1$, $R^2$ and $R^3$ are independently hydrogen, halogen, $R^4$, $-OR^4$ or $-SR^4$; and $R^4$ is aryl of 4 to 12 carbons or aliphatic of 1 to 20 carbons. Halogen is preferably chlorine, bromine or iodine. Other similar pyrrole compounds which may be polymerized according to the methods of the present invention will be apparent to those skilled in the art. Preferably, $R^1$ is hydrogen and $R^2$ and $R^3$ are independently hydrogen or methyl. More preferably, $R^1$, $R^2$ and $R^3$ are each independently hydrogen, i.e. pyrrole itself.

The present invention also includes the copolymerization of two or more different monomers of formula I or the copolymerization of two or more different monomers of formula I with one or more other monomers, such as substituted or unsubstituted aniline and thiophene monomers, to produce other electrically conductive polymers. Such copolymers may include polythiophenes, polyfurans, polyanilines and the like.

While the inventors do not wish to be bound by any particular theory or theories, it appears that the initial oxidation of pyrrole monomer and pyrrole monomer derivative to bipyrrole and bipyrrole derivative, generally referred to as the nucleation process, is the rate-determining step in the polymerization of pyrrole and pyrrole derivatives. This nucleation process for pyrrole may be depicted as follows:

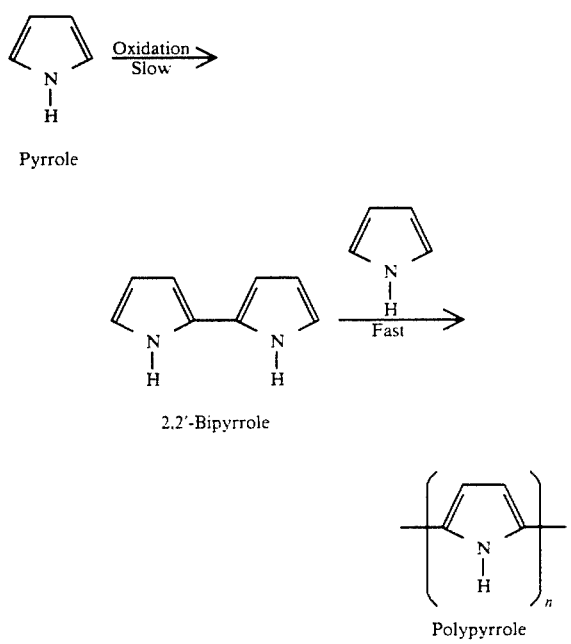

Since the oxidation potentials of 2,2'-bipyrrole and other oligomers of pyrrole and its derivatives are lower than the oxidation potentials of pyrrole monomers, the bipyrrole and other oligomers of pyrrole and its derivatives in the polymerization reaction should be oxidized first, leading to nucleation species upon which the polymer grows. Therefore, the intentional addition of 2,2'-bipyrrole and other oligomers of pyrrole and its derivatives would bypass the rate-determining step and increase the number of the nucleation species in the polymerization reactions. This may explain the higher overall rate of polymerization and more uniform polymer films of polythiophene and its derivatives obtained according to the methods of the present invention.

Since the added bipyrrole or other oligomers of pyrrole and its derivatives have lower oxidation potentials than the pyrrole monomers, lower applied potentials can be effectively used in the polymerization to avoid the undesirable side-reactions caused by over-oxidation to produce polypyrrole and its derivatives with improved quality. It is well established that the molecular weight and molecular weight distribution of a polymer is directly related to the number of the initiation species. Therefore, the molecular weight and molecular weight distribution of polypyrrole and its derivatives prepared according to the methods of the present invention may be controlled and regulated by varying the amount of the bipyrrole or oligomers of pyrrole and its derivatives added to the polymerization reaction mixture.

In accordance with the present invention, the concentration of the compound of formula I in the solvent for the reaction to polymerize the compound of formula I is in the range of about $1 \times 10^{-4}$ mole per liter (M) to about 3 M or more, with the range of about 0.05 M to about 1 M being more preferred.

With both the chemical and electrochemical oxidation methods according to the present invention, the advantages of the invention are obtained by using an initiator to initiate the polymerization of pyrrole or its derivatives. The initiator to be useful in the present invention must have two properties: (i) a lower oxidation potential than the pyrrole monomer or other pyrrole derivative to be polymerized; and (ii) the capability of being incorporated into the polymer chain (i.e., as an integral part of the structural backbone) of the polymer resulting from the polymerization reaction.

As indicated above, the initiators useful in the present invention preferably comprise a compound having the following formula:

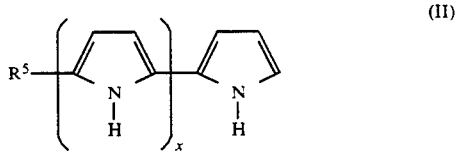

wherein $R^5$ is hydrogen, halogen, $R^6$, $-OR^6$, $-N(R^6)_2$, $-NHR^6$ or $-SR^6$; $R^6$ is aryl of 4 to 12 carbons, aliphatic of 1 to 20 carbons or a polymeric residue; and x is an integer from 0 to 8, with the proviso that when $R^5$ is hydrogen, x is not 0.

The $R^6$ polymeric residue may be, for example, a polyamide, a polyester, a polyether, a polyurethane, a polyacrylate or a vinyl polymer. In accordance with the present invention, the pyrrole nucleus and/or pyrrole nuclei in the initiator may be present as pendant groups or as end groups in the polymer chain of the $R^6$ polymeric residue. Preferably, $R^5$ is hydrogen and x is 1 or 2, and more preferably, $R^5$ is hydrogen and x is 1.

Particularly preferred pyrrole initiators for use in the present invention include the dimeric and trimeric species and other oligomers of pyrrole or its derivatives. For example, the most common dimeric form of pyrrole is 2,2'-bipyrrole which can be readily prepared from a condensation of 2-pyrrolidinone with pyrrole followed by dehydrogenation of the resulting pyrroline based on a modified procedure reported in the literature. See H. Rapoport and N. Castagnoli, Jr., *Journal of the American Chemical Society*, 84, p. 2178 (1962) and H. Rapoport and J. Bordner, *Journal of Organic Chemistry*, 29, p. 2727 (1964). A suitable trimeric species which may be used is 2,2':5',2"-terpyrrole, which can also be prepared based on a similar procedure as that for the preparation of bipyrrole. The oxidation potentials of 2,2'-bipyrrole and 2,2':5'2"-terpyrrole are 0.55 and 0.26 volts (V), respectively, which are much lower than pyrrole (1.2 V).

Other similar compounds comprising a substituted or unsubstituted pyrrole nucleus which may be used as an initiator in the polymerization of the compound of formula I according to the methods of the present invention will be apparent to those skilled in the art. For example, other suitable initiators useful in the present invention include a ring- or N-substituted compound of formula II, polynuclear aromatic compounds such as indoles, higher oligomers of pyrrole and its derivatives, and synthetic polymers that contain one, two or more initiator groups of formula II as chain ends or as pendant groups.

The present invention also includes polymerizing a compound of formula I in the presence of two or more different initiators.

In accordance with the present invention, the concentration of the initiator is in the range of about 0.05 to about 10 mole percent or more of the compound of formula I used in the reaction, with the range of about 0.1 to about 2 mole percent being more preferred.

In the case of polymerization of pyrrole and its derivatives by chemical oxidation, the methods of the present invention may use any of a number of conventional or unconventional inorganic or organic oxidants or oxidizing agents. Generally, it is only required that the oxidant oxidize the compound of formula I and that the oxidant is soluble in the solvent used in the polymerization reaction.

It is preferred that the oxidant is a metal in its higher oxidation states in a salt form with a halide or perhalorate as counterions, an organic or inorganic peroxide, oxygen or an organic oxidizing agent, such as thiourea dioxide $H_2NC(=NH)SO_2H$. Examples of suitable oxidants include iron (III) perchlorate ($Fe(ClO_4)_3$), ironoxychloride (FeOCl), copper (II) perchlorate ($Cu(ClO_4)_2$), $Fe(OH)_3$, $FeCl_3$, $AlCl_3$, $CuCl_2$, $AsF_5$, hydrogen peroxide ($H_2O_2$) and mixtures thereof. Preferably, the oxidant comprises $FeCl_3$. Other suitable oxidizing agents, in addition to those exemplified above, will be apparent in view of the present disclosure.

The molar ratio of oxidant to the compound of formula I (monomer) is preferably in the range of about 0.1:1 to about 20:1 or more, with the range of about 1:1 to about 2.5:1 being more preferred.

In the case of electrochemical polymerization of pyrrole and its derivatives, the reaction is preferably conducted in the presence of an electrolyte. Generally, it is only required that the electrolyte support electrochemical polymerization of the compound of formula I and that the electrolyte is soluble in the solvent used in the polymerization reaction.

In accordance with the present invention, the electrolytes suitable for use in the electrochemical polymerization of pyrrole and its derivatives are those electrolytes typically used in electrochemical reactions and generally include organic and inorganic salts or acids. Examples of suitable electrolytes include tetraalkylammonium, lithium or silver salts or free acids of tetrafluoroborate, hexafluoroarsenate, hexafluorophosphate, perchlorate, fluorosulfonate, hydrogen sulfate, trifluoromethylsulfonate, p-bromobenzenesulfonate, p-toluenesulfonate, trifluoroacetate, halide (e.g. chloride, bromide, fluoride, iodide) or phosphorate, or any suitable mixture thereof.

Preferably, the electrolyte comprises $LiClO_4$. However, other suitable elecrolytes, in addition to those exemplified above, will be apparent in view of the present disclosure. For example, polyelectrolytes including polyphosphorate, polyacrylate, poly(styrene sulfonate), and doped poly(ethylene oxide) can also be used as the electrolytes in the methods of the present invention. Other polyelectrolytes to be used in the present invention would be readily apparent to one of ordinary skill in the art.

In accordance with the present invention, the concentration of the electrolyte is preferably in the range of about 0.001M to about 3M or more, with a concentration of about 0.05M to about 1M being more preferred.

In the case of electrochemical polymerization of pyrrole and its derivatives, the electric potential is generally applied using cyclic potential sweep techniques, potentiostat techniques or galvanostat techniques in a two- or three-electrode cell. Generally, a platinum electrode is used as the electrode upon which the polypyrrole and its derivatives are deposited as films and the potential is applied referenced to a standard saturated calomel electrode (SCE). It is only required that the electrode does not oxidize concurrently with the pyrrole monomers during the polymerization. Other working and reference electrodes include, for example, gold, tin oxide, n-type polycrystalline silicon, gallium arsenide, cadmium sulfide, cadmium selenide, and graphite. Other suitable electrolytic methods and apparatus for carrying out the present invention will be evident to those skilled in the art.

In the methods of the present invention, the up-limit potential may range from about 0.1 V to more than about 2 V vs. SCE when the cyclic potential sweep and potentiostat techniques are used. Preferably, an up-limit potential of about 0.7 V to about 1.0 V vs. SCE may be used in the present invention. In the cyclic potential sweep technique, the rate of potential sweep may range from about 1 to more than about 300 millivolts per second (mV/sec). Preferably, the rate of potential sweep in the cyclic potential sweep technique in the present invention is about 25 to about 150 mV/sec. When the galvanostat technique is used, the current may range from about 1 microampere (uA) to more than about 100 mA with the range of about 0.5 to 10 mA being more preferred.

In accordance with the present invention, the polymerization of the compound of formula I is conducted in solution media, the vapor phase or in an organic or inorganic material. Generally, a suitable solution media to be used in the methods according to the present invention comprises a solvent in which either chemical or electrochemical polymerization of the compound of formula I can be conducted. In addition, the solvent must be one which does not oxidize under the polymerization conditions.

Examples of solvents suitable for chemical or electrochemical polymerization according to the present invention include water, acetonitrile ($CH_3CN$), ethylene glycol, methylene chloride, ethylene chloride, butanone, propylene carbonate, dimethylformamide, dimethylsulfoxide, diethylsulfoxide, ethanol, methanol, hexamethylphosphoramide, nitrobenzene, tetrahydrofuran, low molecular weight polymers, for example, poly(ethylene glycol), or a mixture of two or more of the above solvents. Liquid sulfur dioxide is also an example of a solvent suitable for chemical or electrochemical polymerization according to the present invention.

The polymerization of pyrrole and its derivatives can be carried out inside or at the interface of an organic or inorganic host material (also referred to as a host matrix or template) to improve the polymer chain alignment and regularity or to fabricate special devices, such as drug-release microcapsules. Examples of the host materials include microporous membranes (e.g., Nucleopore-type polycarbonate filtration membranes and Anopore alumina filtration membranes), iron-oxychloride, zeolites, sol-gel-derived metal oxide glasses (e.g., vanadium oxide), a synthetic or natural polymer including the polyelectrolytes, and a surfactant. Other solvents or host materials to be used in the methods according to the present invention will be readily apparent to one skilled in the art based upon the present disclosure.

As with prior art methods, the polymerization of pyrrole and its derivatives is preferably carried out at ambient pressure under an air or inert gas (e.g., argon or nitrogen) atmosphere with or without exclusion of moisture. The temperature range of the chemical or electrochemical polymerization is very broad and not particularly critical, depending upon the solvents used, as long as it does not exceed the boiling point of the solvent or fall below the melting point of the solvent. A preferable temperature range is about $-100°$ C. to about 50° C., with a temperature range of about $-20°$ C. to about room temperature being more preferred. Lower reaction temperatures generally result in slower rates of polymerization, although the polymers formed have higher electrical conductivities. It will be apparent to one skilled in the art, however, that with some organic solvents, the temperature could even be lower or higher.

In accordance with the present invention, the reactions for polymerizing the compound of formula I are conducted for a time to maximize the yield and optimize the properties of the polymers. In the case of chemical polymerization of the compound of formula I, a preferable reaction time is about 1 second to about 6 hours or more. Generally, the longer the reaction time, the higher the yield but the lower the conductivities. Therefore, a reaction time of 10 minutes to about 2 hours is more preferred. In the case of electrochemical polymerization, a preferable reaction time range is about 5 minutes to about 6 hours. However, it will be apparent to one skilled in the art that depending upon the compound of formula I, the initiator, the oxidant, the solvent used, and other synthetic parameters, the reaction times may be shorter or longer.

Perhaps most importantly, the methods of the present invention result in considerably increased polymerization rates and polymer yields. This results in highly cost-effective and energy efficient methods for polymerizing pyrrole and its derivatives.

The invention will now be illustrated in more detail with reference to the following specific, non-limiting examples:

Chemical Synthesis of Polypyrroles

EXAMPLE I

The initiator, 2,2'-bipyrrole, was prepared from the condensation of 2-pyrrolidinone with pyrrole followed by dehydrogenation of the resulting pyrroline based on a modified procedure in the literature. See H. Rapoport and N. Castagnoli, Jr., *Journal of the American Chemical Society*, 84, p. 2178 (1962) and H. Rapoport and J. Bordner, *Journal of Organic Chemistry*, 29, p. 2727 (1964). To synthesize polypyrrole, a solution of pyrrole (0.015 mole) and 2,2'-bipyrrole ($1.5 \times 10^{-4}$ mole) in 5 milliliters (ml) of methanol was cooled to about 0° C. in an ice-water bath. 15 ml of a solution of $FeCl_3$ ($2.45 \times 10^{-2}$ mole) in methanol, precooled to about 0° C., was combined with the solution containing the bipyrrole and pyrrole under vigorous stirring. The resulting solution darkened immediately and became black in color as a precipitate formed. The reaction mixture was stirred for an additional 40 minutes. The precipitate was collected by filtration under reduced pressure and washed with 200 to 400 ml of methanol until the filtrate became colorless. After drying under vacuum for 24 hours at ambient temperature, a black product was obtained in 10% yield. The conductivity of this polymer in a powder-pressed pellet form was measured using the standard four-probe technique to be about 150 S/cm. In contrast, when the same reaction was carried out in the absence of 2,2'-bipyrrole, the rate of reaction was much slower as evidenced by a longer time required for the solution to darken upon addition of the oxidant and by a lower yield (1.2%) of the product.

EXAMPLES II–VIII

Example I was repeated under similar reaction conditions except the concentrations of $FeCl_3$, pyrrole and 2,2'-bipyrrole were varied (see Examples II and III), the reaction temperature was varied (see Examples IV-VI), and N-methylpyrrole was used as the monomer instead of pyrrole and the concentration of $FeCl_3$ and 2,2'-bipyrrole was varied (see Examples VII and VIII). The results are summarized in Table I.

TABLE I

| | Polymerization of Pyrrole and N-methylpyrrole in Methanol | | | | | |
|---|---|---|---|---|---|---|
| | | Concentration in mole per liter (M) | | Temperature | Yield (%) of polymer at amount of 2,2'-bypyrrole* | | |
| Example | Monomer | [FeCl$_3$] | [Monomer] | (°C.) | None | 0.5% | 1.0% |
| I | Pyrrole (P) | 1.5 | 0.75 | 0 | 1.2 | 7.0 | 10.0 |
| II | P | 2.0 | 1.00 | 0 | 7.8 | 12.6 | 15.5 |
| III | P | 2.5 | 1.44 | 0 | 14.9 | 18.4 | 21.7 |
| IV | P | 1.9 | 1.33 | −20 | 0 | 2.4 | |
| V | P | 1.9 | 1.33 | 0 | | 13.4 | |
| VI | P | 1.9 | 1.33 | 20 | | 21.1 | |
| VII | N-Methyl-pyrrole (NMP) | 1.9 | 1.07 | 0 | 2.4 | 5.7 | |
| VIII | NMP | 2.5 | 1.07 | 0 | 14.9 | | 20.7 |

*Molar percentage of 2,2'-bipyrrole to monomer.

Table I demonstrates that an increase in the concentration of the initiator (2,2,-bipyrrole) resulted in a significant increase in the yield of the polymer. Generally, the higher the concentration of oxidant or monomer, the higher the yield (see Examples I–III in Table I) and the higher the reaction temperature, the higher the yield (see Examples IV-VI in Table I). In the presence of the bipyrrole, the yields of poly(N-methylpyrrole) were also improved signifcantly (see Examples VII and VIII in Table I).

Electrochemical Synthesis of Polypyrroles

Electrochemical syntheses and cyclic voltammetry were performed on an EG&G PAR Model 273 potentiostat/galvanostat. A 3-electrode cell was used with a saturated calomel electrode (SCE) as reference and platinum foils as working and counter electrodes.

EXAMPLE IX

In this example, polypyrrole film was prepared on the platinum working electrode having a surface area of 3 cm$^2$ by cycling the potential between −0.5 and 0.8 volts (V) vs. SCE at a sweep rate of 100 mV/sec at room temperature. The reaction mixture consisted of a solution of 0.2M pyrrole, $0.2 \times 10^{-3}$M 2,2'-bipyrrole and 0.1 M lithium perchlorate in $CH_3CN$. The electrolyte was purged with nitrogen gas for about 10 minutes before applying the potential. The cyclic voltammograms of polymerization were recorded continuously and coincidentally with the synthesis. Before each consecutive potential cycle, the potential was held at −0.5 V for 10 seconds. The amount of polypyrrole formed on the electrode was monitored by measuring the change in the cathodic charge, which was found to be directly proportional to the amount of polypyrrole deposited on the electrode. In the presence of 0.1% (mole) of 2,2'-bipyrrole, the amount of polypyrrole formed on the electrode was about three times (300%) of that in the absence of 2,2'-bipyrrole under the identical experimental conditions. The amount of polypyrrole deposited on the electrode is graphically set forth in the FIGURE.

EXAMPLES X–XIII

Example IX was repeated using the same reaction conditions except the potentials were cycled between −0.5 and 0.9 V vs. SCE (Example X); and the concentrations of 2,2'-bipyrrole were varied among: 0.0 M (i.e., no initiator was added) (Example XI), $0.5 \times 10^{-3}$ M (Example XII), and $1.0 \times 10^{-3}$ M (Example XIII).

The amounts of polypyrrole formed (represented by the cathodic charge) are plotted against reaction time (represented by the cycle number) are shown in the FIGURE for each example. In all the examples, a significant increase in the rate of polymerization was observed in the presence of the bipyrrole (compared to no bipyrrole in Example XI). The increase in the up-limit potential and the concentration of the bipyrrole resulted in a further increase in the rate of polymerization. In all the examples, the films of polypyrrole deposited on the electrode in the presence of the bipyrrole were more uniform than those in the absence of the bipyrrole. In the cyclic voltammograms recorded during the polymerizations, the anodic peak potential shifted gradually to higher values as the polymerization reactions proceeded due to the decrease in conductivity of the polymer. The extent of this potential shift in the presence of the bipyrrole was found to be much smaller, indicating higher conductivities of the polymer, than the potential shift in the absence of the bipyrrole.

EXAMPLE XIV

Poly(N-methylpyrrole) was synthesized following the same procedure as described in Example IX except N-methylpyrrole was used as the monomer instead of pyrrole. The results were similar to those described in Example IX. The amount of poly(N-methylpyrrole) deposited on the electrode increased by 250 to 300% in the presence of 2,2'-bipyrrole as compared to the amount of poly(N-methylpyrrole) deposited on the electrode in the absence of the bipyrrole under the same reaction conditions.

The present invention may be embodied in other specific forms without departing from the spirit or the essential attributes thereof and, accordingly, reference should be made to the apended claims, rather than to the foregoing specification as indicating the scope of the invention.

We claim:

1. A method for polymerizing a compound having the following formula:

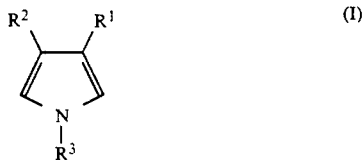

wherein $R^1$, $R^2$ and $R^3$ are independently hydrogen, halogen, $R^4$, $-OR^4$ or $-SR^4$; and $R^4$ is aryl of 4 to 12 carbons or aliphatic of 1 to 20 carbons, comprising reacting the compound of formula I in the presence of:
   a. an initiator, the initiator comprising a 2-substituted pyrrole nucleus which has a lower oxidation potential than the compound of formula I and which is capable of being incorporated into the polymer resulting from the polymerization reaction;
   b. a chemical oxidant or an applied electrochemical potential; and
   c. a solvent.

2. The method according to claim 1 wherein $R^1$ is hydrogen, and $R^2$ and $R^3$ are independently hydrogen or methyl.

3. The method according to claim 1 wherein $R^1$, $R^2$, and $R^3$ are independently hydrogen.

4. The method according to claim 1 wherein the initiator is a compound having the following formula:

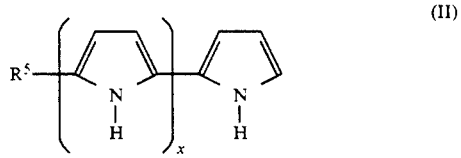

wherein
   $R^5$ is hydrogen, halogen, $R^6$, $-OR^6$, $-N(R^6)_2$, $-NHR^6$ or $-SR^6$;
   $R^6$ is aryl of 4 to 12 carbons, aliphatic of 1 to 20 carbons or a polymeric residue; and
   x is an integer from 0 to 8, with the proviso that when $R^5$ is hydrogen, x is not 0.

5. The method according to claim 4 wherein the polymeric residue is a polyamide, a polyester, a polyether, a polyurethane, a polyacrylate or a vinyl polymer.

6. The method according to claim 4 wherein $R^5$ is hydrogen and x is 1 or 2.

7. The method according to claim 4 wherein $R^5$ is hydrogen and x is 1.

8. The method according to claim 1 wherein the oxidant oxidizes the compound of formula I and is soluble in the reaction solvent.

9. The method according to claim 8 wherein the oxidant is selected from the group consisting of a metal halide, a metal perchlorate, an organic peroxide, an inorganic peroxide, oxygen and an organic oxidizing agent.

10. The method according to claim 8 wherein the oxidant is selected from the group consisting of iron (III) perchlorate, copper (II) perchlorate, $Fe(OH)_3$, $FeCl_3$, $AlCl_3$, $CuCl_2$, $AsF_5$ and $H_2O_2$.

11. The method according to claim 8 wherein the oxidant comprises $FeCl_3$.

12. The method according to claim 1 wherein the reaction is conducted in the presence of an electrolyte.

13. The method according to claim 12 wherein the electrolyte supports electrochemical polymerization of the compound of formula I and is soluble in the reaction solvent.

14. The method according to claim 12 wherein the electrolyte is selected from the group consisting of tetraalkylammonium salts, lithium salts, silver salts, organic acids and inorganic acids.

15. The method according to claim 14 wherein the tetraalkylammonium, lithium and silver salt counterions are selected from the group consisting of tetrafluoroborate, hexafluoroarsenate, hexafluorophosphate, perchlorate, fluorosulfonate, hydrogen sulfate, trifluoromethylsulfonate, p-bromobenzenesulfonate, p-toluenesulfonate, trifluoroacetate, chloride, bromide, iodide, fluoride and phosphorate.

16. The method according to claim 14 wherein the acids are free acids selected from the group consisting of tetrafluoroboric, hexafluoroarsenic, hexafluorophosphoric, perchloric, fluorosulfonic, sulfuric, trifluoromethylsulfonic, p-bromobenzenesulfonic, p-toluenesulfonic, trifluoroacetic, hydrohalic, and phosphoric.

17. The method according to claim 12 wherein the electrolyte comprises $LiClO_4$.

18. The method according to claim 12 wherein the electrolyte comprises a polyelectrolyte.

19. The method according to claim 18 wherein the polyelectrolyte is selected from the group consisting of polyphosphorate, polyacrylate, poly(styrene sulfonate), and doped poly(ethylene oxide).

20. The method according to claim 1 wherein the electrochemical potential is applied by a cyclic potential sweep technique, a potentiostat technique or a galvanostat technique.

21. The method according to claim 1 wherein the solvent supports electrochemical polymerization of the compound of formula I and the solvent does not oxidize.

22. The method according to claim 21 wherein the solvent is selected from the group consisting of water, acetonitrile, ethylene glycol, methylene chloride, ethylene chloride, butanone, propylene carbonate, dimethylformamide, diethylsulfoxide, dimethylsulfoxide, ethanol, methanol, hexamethylphosphoramide, nitrobenzene, tetrahydrofuran, low molecular weight polymers and liquid sulfur dioxide.

23. The method according to claim 1 wherein the concentration of the compound of formula I is about $1 \times 10^{-4}$M to about 3M.

24. The method according to claim 1 wherein the concentration of the compound of formula I is about 0.05M to about 1M.

25. The method according to claim 1 wherein the concentration of the initiator is about 0.05 to about 10 mole percent of the compound of formula I used in the reaction.

26. The method according to claim 1 wherein the concentration of the initiator is about 0.1 to about 2 mole percent of the compound of formula I used in the reaction.

27. The method according to claim 1 wherein the molar ratio of the oxidant to the compound of formula I is about 0.1:1 to about 20:1.

28. The method according to claim 27 wherein the molar ratio of the oxidant to the compound of formula I is about 1:1 to about 2.5:1.

29. The method according to claim 12 wherein the concentration of the electrolyte is about 0.001M to about 3M.

30. The method according to claim 12 wherein the concentration of the electrolyte is about 0.05M to about 1M.

31. The method according to claim 1 wherein the reaction is conducted at about −100° C. to about 50° C.

32. The method according to claim 1 wherein the reaction is conducted at about −20° C. to about room temperature.

33. The method according to claim 1 wherein the chemical polymerization is conducted for about 1 second to about 6 hours.

34. The method according to claim 1 wherein the electrochemical polymerization is conducted for about 5 minutes to about 6 hours.

35. In a method of preparing polypyrrole comprising reacting pyrrole in a solvent with a chemical oxidizing agent, the improvement comprising polymerizing pyrrole in the presence of an initiator, the initiator comprising a 2-substituted pyrrole nucleus which has a lower oxidation potential than pyrrole and which is capable of being incorporated into the polymer chain resulting from the polymerization reaction.

36. In a method of preparing polypyrrole electrochemically comprising reacting pyrrole in a solvent by applying an electrochemical potential between a platinum electrode and a saturated calomel electrode in the solvent, and plating the polypyrrole on the platinum electrode, the improvement comprising adding to the solvent an initiator, the initiator comprising a 2-substituted pyrrole nucleus which has a lower oxidation potential than pyrrole and which is capable of being incorporated into the polymer chain resulting from the polymerization reaction.

* * * * *